United States Patent [19]

Mano

[11] Patent Number: 4,926,490
[45] Date of Patent: May 15, 1990

[54] METHOD AND APPARATUS FOR RECOGNIZING CHARACTERS ON A DOCUMENT

[75] Inventor: Takashi Mano, Fujisawa, Japan

[73] Assignee: International Business Machines Corporation, Armonk, N.Y.

[21] Appl. No.: 181,894

[22] Filed: Apr. 15, 1988

[30] Foreign Application Priority Data

Apr. 17, 1987 [JP] Japan .................................. 62-93435

[51] Int. Cl.⁵ ............................................. G06K 9/34
[52] U.S. Cl. ....................................................... 382/9
[58] Field of Search ................... 382/9, 46, 65, 61, 62, 382/63, 48, 25, 26

[56] References Cited

FOREIGN PATENT DOCUMENTS 56-204636 12/1981 Japan .

OTHER PUBLICATIONS

Segmentation Methods for Recognition of Machine--printed Characters R. L. Hoffman, J. W. McCullough, pp. 153–165, IBM Journal of Research and Development, vol. 15, No. 2, 3/71.
Document Analysis System, K. Y. Wong, R. G. Casey, F. M. Wahl, pp. 647–656, IBM Journal of Research and Development, vol. 26, No. 6, 11/82.
A Processor–Based OCR System, R. G. Casey, C. R. Jih, IBM Journal of Research and Development, vol. 27, No. 4, 7/83, pp. 386–399.
Recursive Segmentation and Classification of Composite Character Patterns, R. G. Casey, G. Nagy, pp. 1023–1026, vol. 2, Proceedings from the 6th International Conference on Pattern Recognition, Munich, Germany, 10/19–22, 1982.
Unsupervised Construction of Decision Networks for Pattern Classification R. G. Casey, S. K. Chai, and K. Y. Wong, pp. 1256–1258, IEEE Seventh International Conference on Pattern Recognition, 7/30–8/2/84, Montreal, Canada.

Primary Examiner—Leo H. Boudreau
Attorney, Agent, or Firm—Kenneth A. Seaman

[57] ABSTRACT

A method and apparatus for recognizing characters on a document, even if the document is skewed or not aligned with the axis of a typical segmentation apparatus such as a scanner. A plurality of rectangles are formed surrounding respective character images, with position data for each rectangle stored in a first table in which plural position data of the rectangles are arranged in order from the left-most rectangle to the right-most rectangle in the X direction of the XY coordinates of the image buffer. By determining the rectangles belonging to one character row in the first list and calculating the positions of the bottom left corners of the rectangles, skew of the document is calculated. Vertical positions of the rectangles compensated by the skew in the Y direction are calculated to transfer the position data of the rectangles belonging to the first character row to a second table. The image data surrounded by the rectangles specified by the position data in the second list are sequentially supplied to a character recognition unit.

12 Claims, 6 Drawing Sheets

METHOD AND APPARATUS FOR RECOGNIZING CHARACTERS ON A DOCUMENT

BACKGROUND OF THE INVENTION

1. Field of the Invention

The invention relates to a method and apparatus for recognizing characters on a document which is skewed relative to an image scanner.

2. Prior Art

Optical character recognition (OCR) technology has been used to recognize character images on a document. The OCR technology includes the steps of scanning the image of the document, comparing analog signals generated by the scanning operation with a threshold value to generate binary signals representing the image of the document, storing the binary signals in an image buffer, segmenting the character images, that is, breaking the image of the document into separate, distinct images of each character, recognizing the segmented character images, and outputting the results of the recognition.

The prior segmentation includes a step of attempting to separate character rows from each other.

In the case shown in FIGS. 1B and 1C, the character images in the first character row are not separated from the character images in the second character row, whereby two character rows are treated as a single row, so that the characters in the both rows are mixed with each other, and printed out in a single character row of an output print out indicating the results of the OCR of the document. To assure the separation of the character rows, the maximum skew angle for a standard A4 size document is about 1 degree. To perform the separation of the character rows for more skewed documents, the Japanese patent application 56-204636 indicates a solution in which the character rows are separated into plural blocks as shown by vertical dotted lines in the FIG. 3C, and a block projection is generated for each block, and the segmentation of the characters of a block, is made based upon the block projection. Continuity of one block to the next block is recognized to recognize the characters of one character row. Although the patent application 56-204636 somewhat improves the problem, it requires a complicated process for finding out the continuity of the blocks. An inherent problem included in the technology using the projections is that the technology does not successfully operate when the characters and a photograph are mixed in the horizontal direction of the document.

R. L. Hoffman and J. W. McCullough, Segmentation Methods for Recognition of Machine-Printed Characters. IBM Journal of Research and Development, vol. 15 (1971), 153-165, describes an algorithm for separation of touching characters. Scanned characters are examined for their vertical densities (i.e., number of black pixels in each vertical line). and low density lines will be selected as the boundaries of characters. Hence, the method in the article apparently differs from that of the present invention.

K. Y. Wong, R. G. Casey, and F. M. Wahl, Document Analysis System, IBM Journal of Research and Development. vol. 26 (1982), 647-656, describes a general concept of an office system for document analysis. There is a description of a segmentation of characters using the projection method, as described hereinabove. The concept of the article apparently differs from that of the present invention.

R. G. Casey and G. Nagy, Recursive Segmentation and Classification of Composite Character Patterns, Proceedings of 6th International Conference on Pattern Recognition (1982), describes on a segmentation method in the case several characters are connected. As the first step of segmentation, a method presented in the Wong's article is used. The algorithm which is described will be used if the segmented block is supposed to be connected characters. The concept of the article apparently differs from that of the present invention.

R. G. Casey and C. R. Jih, A Processor-Based OCR System, IBM Journal of Research and Development, vol. 27 (1983), 386-399, describes a general method for OCR systems. The algorithm is that characters are segmented after the baseline detection. Also the Decision Tree Algorithm is described here. The article does not disclose the concept of the present invention.

R. G. Casey, S. K. Chai, and K. Y. Wong, Unsupervised Construction of Decision Networks for Pattern Classification, Proceedings of IEEE 7th International Conference on Pattern Recognition (1984), describes a recognition algorithm, and there is no description on the segmentation.

SUMMARY OF THE INVENTION

It is therefore the principal object of the present invention to provide a method and apparatus for recognizing the characters and symbols on the document.

It is another object of the present invention to provide a method and apparatus for recognizing the characters and symbols of the document which is skewed or inclined with respect to an image scanner.

A document is scanned by an image scanner and image data representing the image of the document is stored in an image storage means. Rectangles contacting and surrounding outer boundaries of each image of plural character rows in the image storage means are generated, and the positions of four edges of the rectangle in XY coordinates of the image storage means are detected. A size of a rectangle is calculated based upon the detected positions of the edges, and the size of each rectangle is compared with a expected size range for the characters and symbols to be recognized. The positions of the rectangles falling into the size range are stored in a first table as the position data wherein the position data of the rectangles of the characters and symbols over the plural character rows are arranged in the first list in the order from a rectangle at one end to a rectangle at the other end along the direction of the X axis of the XY coordinates.

The position data of the rectangles in the first list are sequentially fetched in the arranged order to detect a size of each rectangles to determine an average size of all rectangles stored in the first list. Again, the position data of the rectangles in the first list are sequentially fetched in the arranged order to find out a first rectangle falling into a size range settled based upon the average size. The fetch operations are continued to find out a second rectangle having a bottom left corner located within predetermined distances in the X and Y directions from a bottom left corner of the first rectangle. The fetch operations are continued to find out a third rectangle having a bottom left corner located within the predetermined distances in the X and Y directions from the bottom left corner of the second rectangle. The operations continues to find out a predetermined number of rectangles in one character row satisfying the condition. When the predetermined number of the rectangles have been found, a skew of the character row in the XY coordinates is calculated based upon the positions of the bottom left corners of these rectangles, and this detected skew is treated as the skew of the document.

Again, the position data of the rectangles in the first list are sequentially fetched in the arranged order, and the position of the bottom edge of each rectangle in the Y axis is corrected by the above skew of the document. The corrected position is called as a virtual position of the rectangle hereinafter. Among the virtual positions calculated during the fetch operations, one virtual position located at the highest position on the document is detected and the detected highest virtual position is stored in a register.

Again, the position data of the rectangles in the first list are sequentially fetched in the arranged order, and the virtual position of each rectangle is calculated again. And, a comparison is made as to whether the virtual position of each rectangle falls into a predetermined range from the highest position stored in the register. This range is selected to catch the rectangle of characters, such as the small characters "p", "y", having a leg extended below the base line of the character. During the fetch and compare operations, the position data of the rectangle which falls into the range is transferred from the first list to a second list, and at the end of the operations, the position data of the rectangle in the first character row have been stored in the second list in the order from the rectangle of the first character to the last rectangle of the last character. A recognition unit sequentially fetches the position data of the rectangles stored in the second list, reads the image data in the image storage means surrounded by the rectangle specified by the position data, and recognizes the image data.

BEST MODE OF CARRYING OUT THE PRESENT INVENTION

Figure 1A:
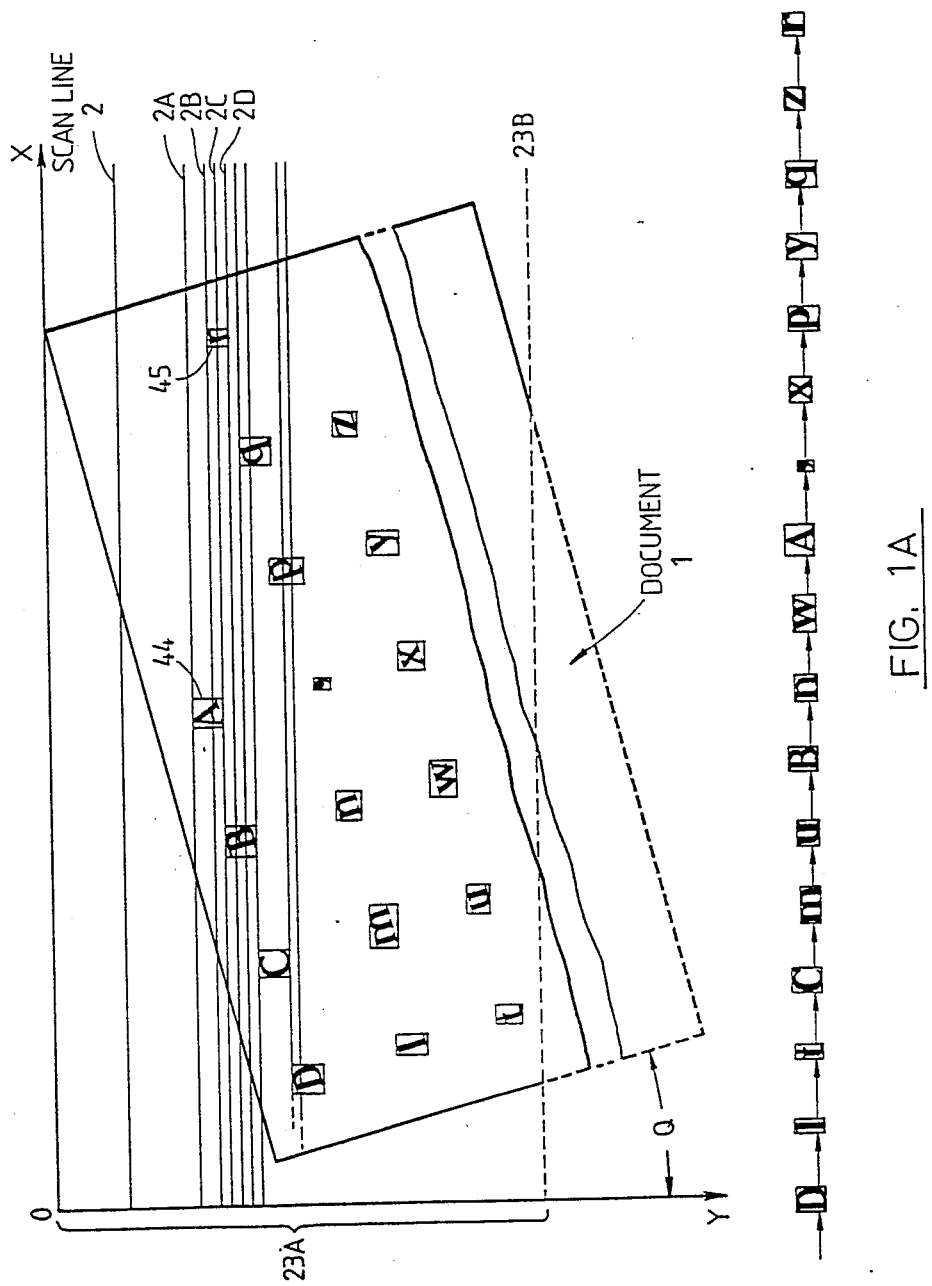
FIG. 1A shows an image of a skewed document and representation of how it might be stored in an image buffer for recognition in accordance with the present invention.

Referring to FIG. 1A, a document 1 including plural character rows is shown. For simplifying the drawing, only three character rows are shown. Further, the spaces between the characters in both the horizontal and vertical directions on the document 1 are more expanded than that of the actual document for understanding the present invention. Each character row, therefore, could include more characters than that shown in the FIG. 1A.

The document 1 is shown as being inclined or skewed by a skew angle $\theta$ in the XY coordinates.

Figure 1C:
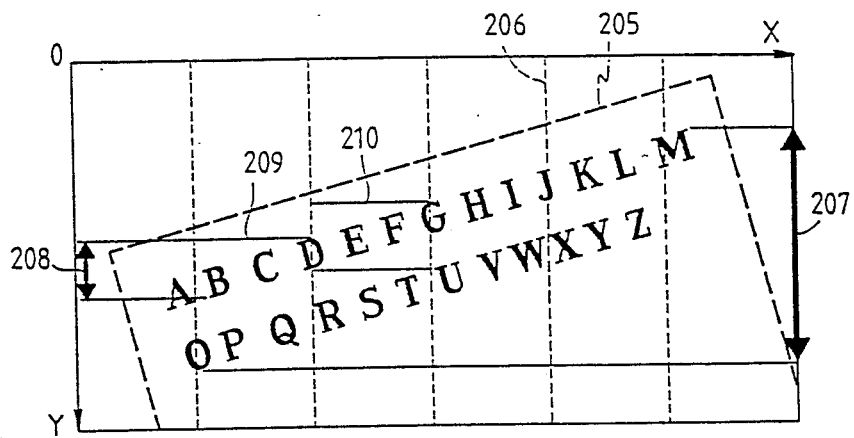
FIGS. 1B and 1C show a prior att technique for segmenting character images on the document.
Figure 1B:
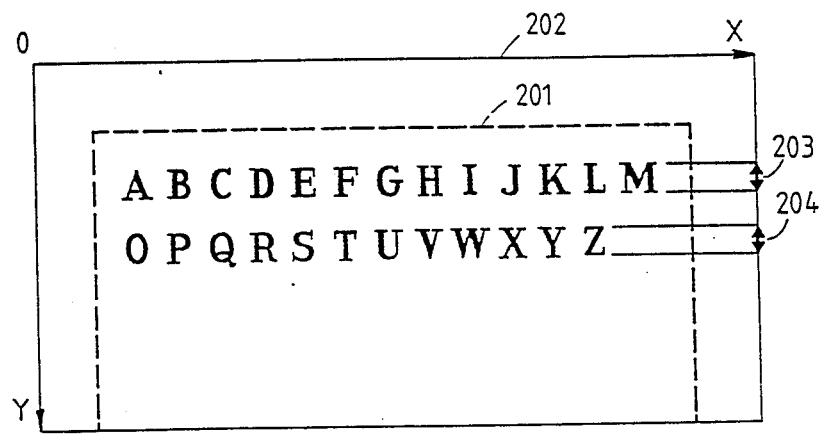

Referring to FIG. 1B, the image of the document 201 stored in the image buffer 202 is shown. FIG. 1B shows that the document 201 has been scanned by a scanner without any skew of the document 201 with respect to the scanner. To separate the character rows from each other, a shadow projection technology has been used. The shadows of all characters are projected to generate projections 203 and 204. The projections 203 and 204 represent the positions of the first and second character rows in the image buffer in the Y axis. A problem arises when the document is skewed or inclined with respect to the scanner, as shown in FIG. 1C. The skewed document 205 generates a long projection 207 into which the first and second character rows are included.

Figure 2:
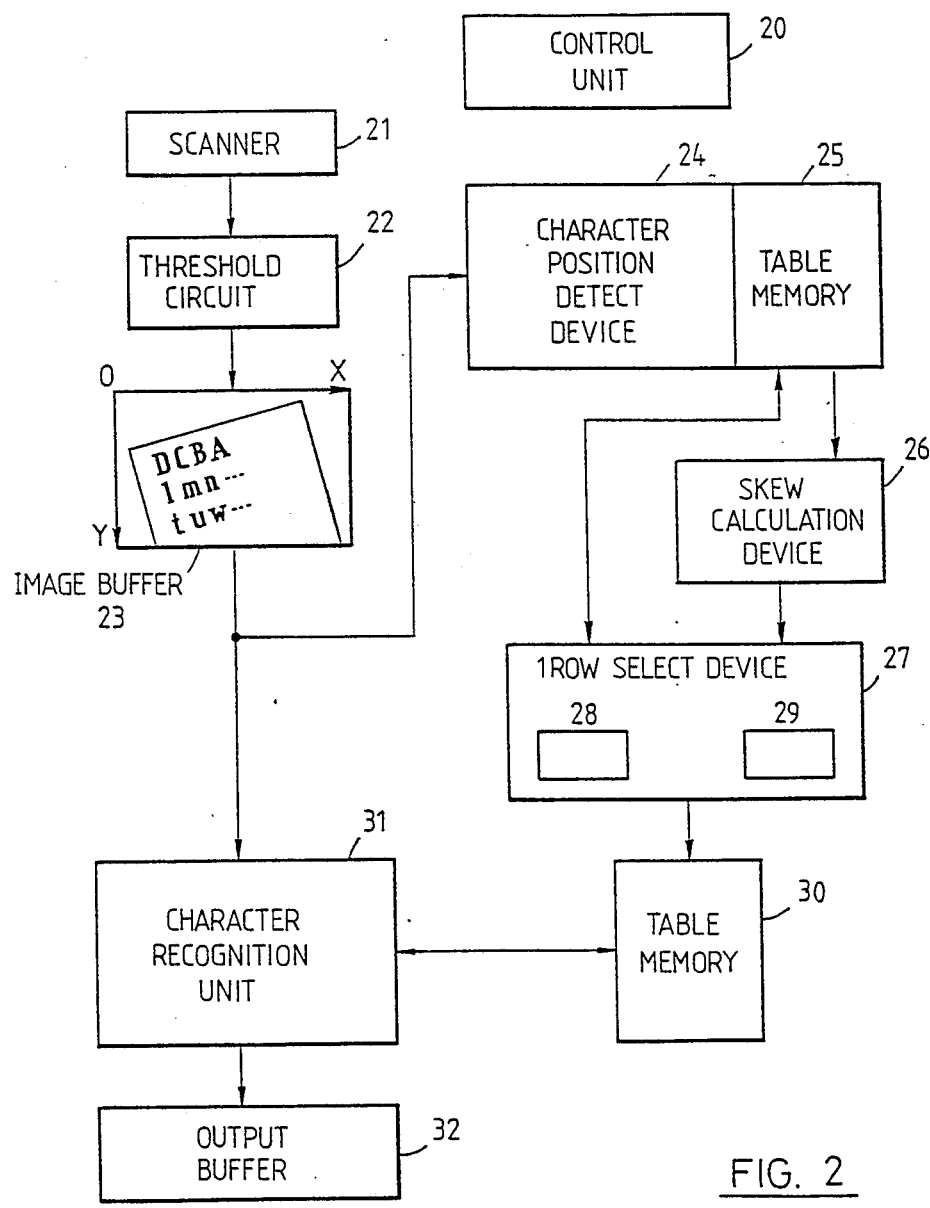
FIG. 2 shows a block diagram of apparatus and methods for carrying out the present invention.

The document 1 is scanned by a document scanner 21 shown in FIG. 2. The document scanner 21 provided with a light source, an optical sensor array and means for relatively moving the document 1 with respect to the optical sensor array. The optical sensor array includes plural optical sensor elements, such as Charge Coupled Devices, arranged in a density or resolution of 240 pels/inch. For example, 2016 optical sensor elements arranged in one row in a horizontal direction are required to scan A4 size document with a width of 210 mm. Each element defines one picture element (pel or pixel). The light from the light source is reflected by the document 1, and the reflected light representing an image of the document 1 is detected by the optical sensor array, which generates electrical analog signals of the pels. The analog signals are supplied to a threshold circuit 22 shown in the FIG. 2 which compares each of the analog signals with a threshold level. If the analog signal exceeds the threshold level, the threshold circuit 22 generates binary "0" signal representing a white level. If the analog signal does not exceed the threshold level, the threshold circuit 22 generates binary "1" signal representing a black level. The optical sensor elements arranged in one line in the horizontal direction define a scan line 2 shown in the FIG. 1A. As the document 1 is relatively moved with respect to the optical sensor elements, the scan line 2 moves downwardly in the Y direction on the document 1, and the image data of the document 1 is progressively stored in an image buffer 23.

A control unit 20 is shown in the FIG. 2. The control unit 20 controls the operations of all blocks in the FIG. 2. For simplifying the drawings, however, the connections between the control unit 20 and the blocks are not shown in the FIG. 2.

The processing operations in accordance with the present invention are generally classified into the following steps:

(A) Scan and store of the image of the document;
(B) Segment of character images and detect the position thereof to form a first list in a first table memory 25;
(C) Detect skew angle of the document;
(D) Reorder the contents of the first list in the first table memory 25 and assemble a second list in a second table memory 30;
(E) Recognition of the character image specified by the contents of the second list Detailed descriptions of the steps (A) through (E) are as follows:

(A) Scan and store of the image of the document

It is assumed that the image buffer 23 has a small storage capacity portion 23A for storing a portion of the skewed document 1 including three character rows.

The control unit 20 responds to an operator's depressing of a start switch of the scanner 21 or the termination of the processes of the step (E) described hereinafter to start the store operation of the image buffer 23. Since the portion shown in the FIG. 1A is the starting part of the document 1, the depressing of the start switch causes the control unit 20 to start the operations. The control unit 20 controls the scanner 21, the threshold circuit 22 and the image buffer 23 to start the scan operations, to supply the electrical signals from the scanner 21 to the threshold circuit 22, and to store the binary signals representing the image data from the threshold circuit 22 into the image buffer 23. The control unit 20 monitors the scan and store operations, stops them and starts the next operations (B) when the image buffer 23 is filled with the image data. The operations are shown as blocks 301 and 302 in the FIG. 3.

(B) Segment of character images and detect the positions thereof to form a first list in a table 25

The control unit 20 activates a character position detect device 24. It accesses the image buffer 23 to sequentially fetch the data of the horizontal bit rows in the order from top to bottom. The purposes of the operations are (i) to segment each character image. i.e., to break the scanned image of the document into separate, distinct images of each character, by generating rectangles each of which surround each character image, (ii) to detect the positions of the rectangles in the XY coordinate of the image buffer 23 and (iii) to store the data representing the positions of the rectangles in a table 25 (FIG. 2) to form a first list. The operations (B) are shown as a block 303 in the FIG. 3. The detailed descriptions of the above mentioned subelements (i), (ii) and (iii) are as follows.

(i) The horizontal data bit lines of the image buffer 23 are sequentially fetched in the order from the top to the bottom by the character position detect device 24. The character position detect device 24 determines the presence of the bits 1, i.e. black pels, in each bit line, generates a rectangle which contacts outer edge of the pattern of the black pels, and calculates the position of the rectangle in the XY coordinate. It is noted that the document 1 may include smear black blocks, long lines, a photograph, etc. which are smaller or larger than expected sizes of the characters and symbols to be recognized by the character recognition unit 31. The character position detect means 24 detects these objects and ignores them.

Figure 4:
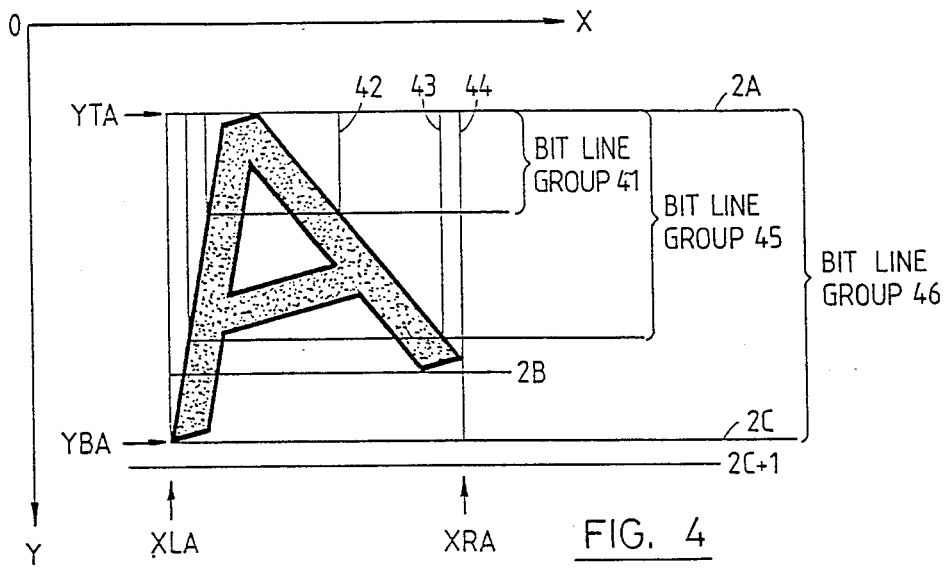
FIG. 4 shows the detection of positions of four edges of a rectangle which contacts the outer boundaries of the character A.

Describing in more detail with referring to the FIGS. 1A and 4, the scan line 2 corresponds to the data bit line of image buffer 23. When the bit line 2A is supplied to the character position detect means 24, it detects the black pel of the top of the character A. As the subsequent bit line group 41 are supplied to the character position detect device 24, it generates a rectangle 42. The character position detect device 24 determines the continuity of the black pels or the image in the supplied bit lines, and grows up the rectangle if it detects the continuity. Referring to the FIG. 4, the rectangle is gradually grown up as shown by 43 and 44, due to the presence of the continuity of the black pels in the bit line groups 45 and 46. The bit line 2C is the final bit line of the bit line group 46. The character position detect device 24 detects the lack of continuity of the black pel in the Y direction by determining the bit line 2C+1, i.e. next bit line to the bit line 2C. In the same manner, the character position detect device 24 detects the lack of continuity in the X direction.

Then, the character position detect device 24 detects the termination of the black pels in the X direction at the bit line 2B and the termination of the black pels in the Y direction at the bit line 2C, and terminates or fixes the growth of the rectangle, whereby the rectangle 44 contacting the outer edges of the continuous black pel group of the character A is generated.

(ii) When the character position detect device 24 completes the rectangle 44, it calculates the following positions of the rectangle 44 surrounding the character "A" in the XY coordinates, as shown in the FIG. 4.

YTA ... Position of the Top edge of the rectangle of the character A in the Y axis in the image buffer 23
YBA ... Position of the Bottom edge rectangle of the character A in the Y axis in the image buffer 23
XLA ... Position of the Left edge of the rectangle of the character A in the X axis in the image buffer 23
XRA ... Position of the Right edge of the rectangle of the character A in the X axis in the image buffer 23

Wherein the first character represents X or Y axis, the second character represents Top, Bottom, Left or Right of the rectangle and the third character represents the character surrounded by the completed rectangle.

It is noted that the character position detect device 24 does not perform a recognition as to whether the continuous black pel group represents the character A. The character position detect device 24 merely detects the rectangles contacting each of the continuous black pel groups and its position and size in the XY coordinates.

Next, the character position detect device 24 determines whether the sizes in the X and Y directions of the rectangle falls into a range settled for the expected sizes of the characters and symbols to be recognized. As described hereinbefore, the purpose of the determination of the sizes of the completed rectangle is to ignore the black block, the long line, the photograph sizes of which are out of the expected sizes of the characters and symbols. When the character position detect device 24 finds out the rectangle of the sizes out of the expected sizes, the character position detect device 24 ignores the rectangle without storing the position data of such rectangle in the next step (iii).

(iii) The character position detect device 24 stores the position data YTA, YBA, XLA and XRA into an entry, e.g., address 2, of a table memory 25 to form the first list, as shown in a table 1.

TABLE 1

| | FIRST LIST | | | | |
|---|---|---|---|---|---|
| ADDRESS | TOP EDGE | BOTTOM EDGE | LEFT EDGE | RIGHT EDGE | POINTER |
| 1 | | | | | 2 |
| 2 | YTA | YBA | XLA | XRA | 0 |

The entry address 1 is the initial entry when the table access is started. The device 24 stores the address 2 as the pointer of the entry 1 which indicates that the next entry to be accessed is the entry 2. The value 0 of the pointer of the entry 2 represents that the entry 2 is the last entry, so that the table access operations are terminated.

In the same manner, the character position detect device 24 completes a rectangle 45 surrounding the character "r", as shown in the FIG. 1A, and calculates the position data YTr, YBr, XLr and XRr. The bottom edge of the rectangle 45 lies on a bit line 2D. The character position detect device 24 stores the data YTr, YBr, XLr and XRr into an entry address 3, as shown below, compares the XLr with the XLA to determine which of the rectangles is close to the value X=0. In this case, since the rectangle of character A is located at the left side of rectangle of the character r, the character position detect device 24 stores the address 3 as a pointer in the entry 2.

TABLE 2

| | FIRST LIST | | | | |
|---|---|---|---|---|---|
| ADDRESS | TOP EDGE | BOTTOM EDGE | LEFT EDGE | RIGHT EDGE | POINTER |
| 1 | | | | | 2 |
| 2 | YTA | YBA | XLA | XRA | 3 |
| 3 | XTr | YBr | XLr | XRr | 0 |

The contents of the first list in the table memory 25 when the characters A, r, B and C have been processed are as follows:

TABLE 3

| | FIRST LIST | | | | |
|---|---|---|---|---|---|
| ADDRESS | TOP EDGE | BOTTOM EDGE | LEFT EDGE | RIGHT EDGE | POINTER |
| 1 | | | | | 5 |
| 2 | YTA | YBA | XLA | XRA | 3 |
| 3 | YTr | YBr | XLr | XRr | 0 |
| 4 | YTB | YBB | XLB | XRB | 2 |
| 5 | YTC | YBC | XLC | XRC | 4 |

It is noted that as the process proceeds, the pointers of the entries have been changed to access the position data in the sequence of C, B, A and r, i.e. in the direction from left to right on the document 1. That is, the table entry 1 stores the pointer 5, which addresses the entry 5 storing the data of the rectangle of the character C and the pointer 4, which addresses the entry 4 storing the position data of the rectangle of the character B and the pointer 2, which addresses the entry 2 storing the position data of the rectangle of the character A and the pointer 3, which addresses the entry 3 of the rectangle of the character r.

It is apparent that whenever the character position detect device 24 completes a new rectangle, the device 24 compares the position in the X axis of this new rectangle to the X axis positions of the old rectangles already stored in the first list, and modifies the pointers of the new and old rectangles to cause the access operations for them to be made in the order from the left end rectangle to the right end rectangle in the direction of the X axis. The contents of the first list in the table memory 25 when all rectangles for the character and symbol images have been processed are shown in the following table 4.

TABLE 4

| | FIRST LIST | | | | |
|---|---|---|---|---|---|
| ADDRESS | TOP EDGE | BOTTOM EDGE | LEFT EDGE | RIGHT EDGE | POINTER |
| 1 | | | | | 7 |
| 2 | YTA | YBA | XLA | XRA | 9 |
| 3 | YTr | YBr | XLr | XRr | |
| 4 | YTB | YBB | XLB | XRB | 10 |
| 5 | YTC | YBC | XLC | XRC | 12 |

TABLE 4-continued

| | FIRST LIST | | | | |
|---|---|---|---|---|---|
| ADDRESS | TOP EDGE | BOTTOM EDGE | LEFT EDGE | RIGHT EDGE | POINTER |
| 6 | YTq | YBq | XLq | XRq | 11 |
| 7 | YTD | YBD | XLD | XRD | 13 |
| 8 | YTP | YBP | XLP | XRP | 14 |
| 9 | YT, | YB, | XL, | XR, | 15 |
| 10 | YTn | YBn | XLn | XRn | 16 |
| 11 | YTz | YBz | XLz | XRz | 3 |
| 12 | YTm | YBm | XLm | XRm | 17 |
| 13 | YTl | YBl | XLl | XRl | 18 |
| 14 | YTy | YBy | XLy | XRy | 6 |
| 15 | YTx | YBx | XLx | XRx | 8 |
| 16 | YTw | YBw | XLw | XRw | 2 |
| 17 | YTu | YBu | XLu | XRu | 4 |
| 18 | YTt | YBt | XLt | XRt | 5 |

The pointers in the first list in the table memory 25 indicates that the initial access to the first list is made at the entry address 1 and the remaining entries are accessed in the sequence shown in the lower part of the FIG. 1A. That is, in the first list shown in the table 4, plural position data of the rectangle are arranged in the order from the left most rectangle to the right most rectangle in the direction of the X axis of the XY coordinates of the image buffer 23. The control unit 20 detects the termination of the operations (B) and starts the next operations (C).

(C) Detection of skew of the document

In the operation, the rectangles which belong to any one of the character rows of the document 1 are picked up and the skew of the document 1 in the XY coordinates is detected.

Detail operations are as follows:

(i) The control unit 20 activates a skew calculation device 26 shown in the FIG. 2. The skew calculation device 26 accesses all entries of the first list (TABLE 4) of the table memory 25 in the order specified by the pointers to fetch the position data i.e. the top, bottom, left and right edge values of each rectangle, and calculates the size of each rectangle in both the X and Y directions. And, the skew calculation device 26 calculates an average size of all rectangles. The operations are represented as a block 304 in the FIG. 3.

(ii) The skew calculation device 26 again accesses all entries of the first list (TABLE 4) in the order specified by the pointers to find out a first rectangle falling into an allowed range from the average size. When the skew calculation unit 26 finds out the first rectangle, it stores in a register, not shown, the data of the bottom and left, i.e. the bottom left corner of the first rectangle.

In the exemplary case, the first rectangle is the rectangle of the character D. And, the skew calculation device 26 continues the access of the first list to find out a second rectangle, which is located right side of the first rectangle, which falls into said allowed range and satisfies the following conditions (1) and (2):

$$X_f + X_1 < X_s < X_f + X_2 \tag{1}$$

$$Y_f - Y_1 < Y_s < Y_f + Y_2 \tag{2}$$

Figure 5A:
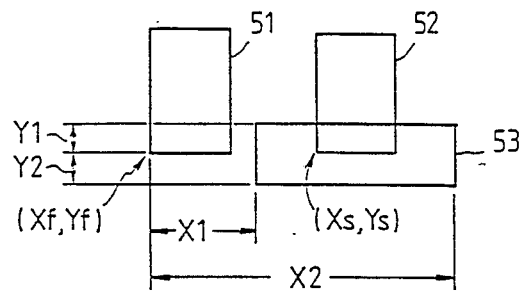
FIGS. 5A, 5B and 5C show the detection of the rectangle, the bottom left corner of which is located within a predetermined distance in the X and Y axes from the bottom left corner of the rectangle of FIG. 4.

These values represent the positions and distances shown in FIG. 5A.

$X_f, Y_f \ldots$ Position of the bottom-left corner of the first rectangle 51

$X_s, Y_s$ ... Position of the bottom-left corner of the second rectangle 52

$X_1$ ... Predetermined distance from $X_f$ $X_2$ ... Predetermined distance from $X_f$ $Y_1$ ... Predetermined distance from $Y_f$, and $Y_2$ ... Predetermined distance from $Y_f$ The value $X_1$ is experimentally selected to accommodate the case that first rectangle is the narrowest one for the narrow character, such as "1". The value $X_2$ is also experimentally selected to accommodate the case that the second rectangle is double-spaced from the first rectangle. The values $Y_1$ and $Y_2$ are also experimentally selected to accommodate the case that the maximum skew angle $\theta$ of the document 1 is 5°. The other consideration used to select the value $Y_2$ is to reject the character, such as "p", in the FIG. 5C, having a long extension below its base line, since the skew of the document 1 is determined based upon the positions of the bottom-left corners of the rectangles, as stated hereinbelow.

Figure 5B:
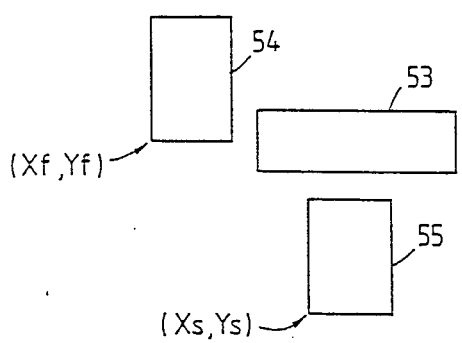
Figure 5C:
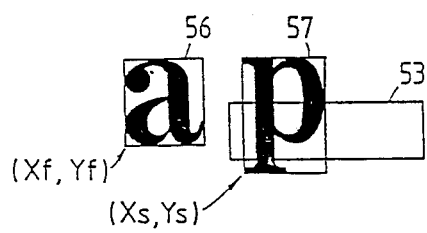

The values $X_1, X_2, Y_1$ and $Y_2$ define an area 53, as shown in the FIGS. 5A, 5B and 5C. The conditions (1) and (2) determine if the bottom-left corner $(X_s, Y_s)$ of the second rectangle 52 falls into the area 53. The second rectangle 52 in the FIG. 5A satisfies the conditions (1) and (2). The second rectangle 55 in FIG. 5B does not satisfy the conditions (1) and (2). The second rectangle 57 in FIG. 5C satisfies the condition (1), but does not satisfy the condition (2).

When the skew calculation device 26 determines the second rectangle, in the case of the FIG. 1A, the rectangle of the character C, which satisfies the conditions (1) and (2), it stores in the register the position data of the bottom and the left of the second rectangle. It is noted that the register of the skew calculation device 26 now stores the position data of the bottom-left corners of the first and second rectangles. And, the skew calculation device 26 continues the access of the first list (TABLE 4) to find out the third rectangle which has a bottom-left corner falling into the area 53 of the second rectangle. When it determines the third rectangle, in this case the rectangle of the character B, it stores the position data of the bottom and the left of the third rectangle in the register. In this manner, the skew calculation device 26 determines a series of the rectangles which have the bottom-left corner fallen into the area 53 of the preceding rectangle, and determines whether the number of the found rectangles is equal to a predetermined number, such as 15. The number was selected under the assumption that a standard English letter of a standard type format includes at least 15 average size characters in one character row. Any other number could be used.

At the termination of the first search of the first list started by specifying the rectangle of the character D as the first rectangle, the skew calculation device 26 has found out the four rectangles of the characters D, C, B and A.

Since this number is smaller than 15, the skew calculation device 26 resets the data stored in the register, and starts the second search of the first list by specifying the rectangle of the character C as the first rectangle. It is apparent that the searches repeated three times by specifying as the first rectangle the rectangles of the characters C, B and A, respectively do not find out 15 rectangles each of which has the bottom-left corner falling into the area 53, i.e. the conditions (1) and (2), of the preceding rectangle. The skew calculation device 26 starts the fifth search by specifying the rectangle of the character 1 as the first rectangle. It is assumed that the second character row beginning with the character 1 of the document 1 in the FIG. 1A includes 15 average size characters, though only 7 characters are shown in the FIG. 1A. At the termination of the fifth search, the skew calculation device 26 knows that the 15 rectangles have been found. And, the position data representing the bottom-left corners of the found 15 rectangles have been stored in the register. The skew calculation device 26 fetches the position data in the register, and generates a skew angle of the second character row by using a method of least square, which has been well known in the art. And, the skew calculation device 26 keeps the skew angle for use of it as the skew angle of the document 1 in the latter process.

Figure 3:
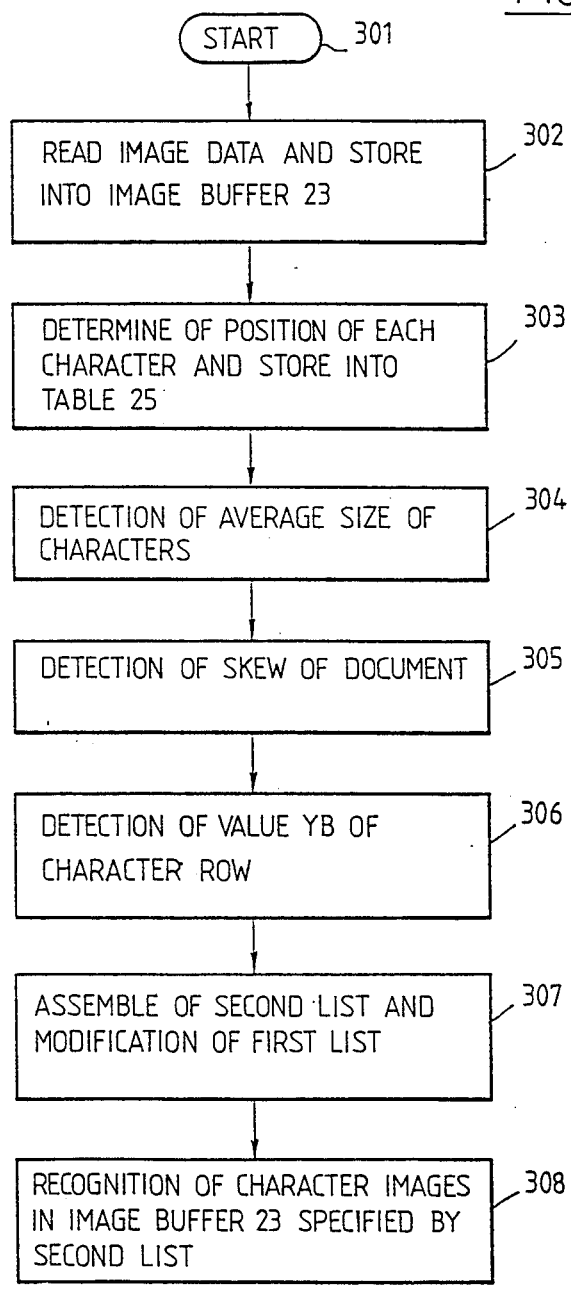
FIG. 3 shows a flowchart of the principal steps of the present invention.

The operations are shown as a block 305 in the FIG. 3. The control unit detects the termination of the operations (C) and starts the next operations (D).

(D) Reorder of the contents of the first list in the table memory 25 and assemble of a second list in a table memory 30

The purpose of the reorder of the contents in the first list is to find out the rectangles of the characters and symbols belonging to one character row among all rectangles stored in the first list, to fetch the position data of the characters of these rectangles, and to store them in a table memory 30 to form a second list. The following detail description relates to the above operations for storing the position data of the rectangles of the characters D, C, B. A belonging to the first character row of the document 1 shown in the FIG. 1A, into the table memory 30 to form the second list.

Detail operations are as follows.

(i) The control unit 20 activates one row select device 27 shown in the FIG. 2. The one row select device 27 receives the value of the skew angle of the document 1 from the skew calculation device 26 and stores it in a register 28. The one row select device 27 accesses the first list (TABLE 4) in the table memory 25 to sequentially fetch the bottom and left values of each rectangle in the order specified by the pointers, i.e. in the order of the characters shown in the lower part of the FIG. 1A. The first values YBD and XLD fetched from the first list represent the position of the bottom-left corner of the rectangle of the character D in the XY coordinates. The one row select device 27 performs the following calculations:

$$YB = (XLD \times \tan \theta) + YBD \qquad (3)$$

Figure 6:
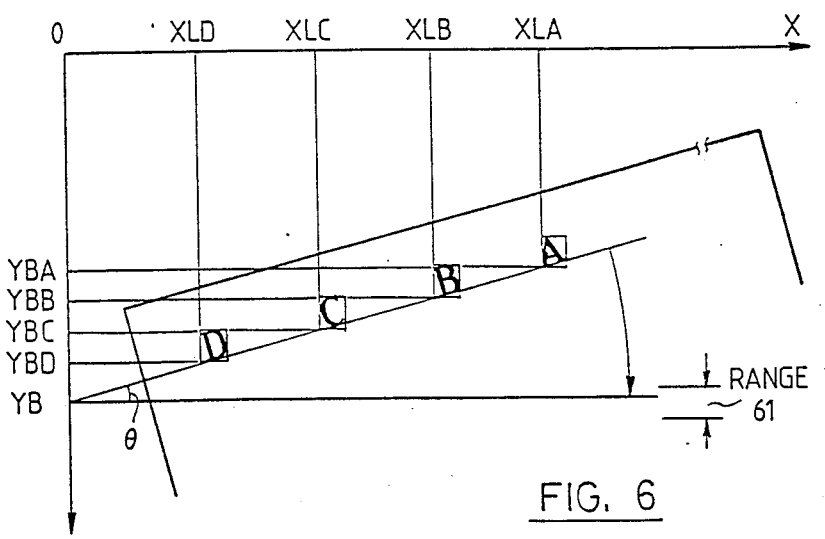
FIG. 6 shows the generation of the virtual positions of the rectangles.

The value YB represents a virtual position of the bottom-left corner of the rectangle in the Y axis when the document 1 is rotated in a clockwise direction to correct the skew angle, as shown in the FIG. 6. The virtual position YB is stored in a register 29 of the one row select device 27. Next, the one row select device 27 fetches the position data YB1 and XL1 of the rectangle of the character 1 and generates the virtual value YB for the bottom left corner of the rectangle, and compares the YB for the rectangle of the character 1 with the value YB for the rectangle of the character D to determine which of the both values is smaller. In this case, the YB for the rectangle of the character D is selected, and the content of the register 29, i.e. the value YB for the rectangle of the character D is not changed. In this manner, the one row select device 27 continuously accesses all position data in the first list (TABLE 4), and generates the virtual value YB of each rectangle, and compares the new value YB with the old value YB stored in the register 29, and replaces the old value YB by the new value YB if the new value is smaller than the old value YB, so that the smallest value YB among all rectangles is stored in the register 29. The smallest value YB indicates the value YB of the rectangle in the first character row, which is located at the highest position on the document, as shown in the FIG. 6. The operations are shown as a block 306 in the FIG. 3.

(ii) The one row select device 27 again accesses the first list (TABLE 4) in the table memory 25 in the order specified by the pointer, i.e. in the order shown in the lower part of the FIG. 1A. The one row select device 27 fetches the position data YBD and the XLD of rectangle of the character D, and performs the calculation (3) as described hereinabove. And, the one row select device 27 determines whether the calculated value YB falls into a range 61 shown in FIG. 6, or not. The lower limit of the range 61 is selected to catch the rectangles of the characters having the long leg below the base line, such as the characters p and y. In this case, the answer is YES, then the one row select device 27 decides as that the character D belongs to the first character row, and fetches the four position data of the rectangle of the character D, i.e. YTD, YBD, XLD and XRD of the entry 7 of the first list (TABLE 4) in the table memory 25 and stores them in an entry 1 of the second list of the table memory 30. Also, the one row select device 27 replaces the pointer 7 in the entry 1 of the first list by the pointer 13 in the entry 7 of the rectangle of the character D, and deletes the contents in the entry 7.

The modification of the pointer is performed for skipped the deleted entry 7 and pointing the entry 13 of the next character 1.

Next, the one row select device 27 fetches the four position data of the rectangle of the character 1 in the entry 13 of the first list and repeats the calculation and the comparison. The comparison indicates that the calculated value YB of the rectangle of the character 1 does not fall into the range 61 settled for the first character row, that is, the character 1 does not belong to the first character row. The one row select device 27 does nothing anymore on the rectangle of the character 1, and accesses the entry 18 specified by the pointer 18 in the entry 13, and repeats the above calculation and comparison. The comparison again indicates that the calculated value YB of the rectangle of the character "t" does not fall into the range 61, hence the one row select device 27 terminates the process of the rectangle of the character "t" and accesses the entry 5 which is specified by the pointer 5 in the entry 18. The entry 5 stores the four position data of the rectangle of the character C in the first character row. The comparison indicates that the calculated value YB of the rectangle of the character C falls into the range 61, and the one row select device 27 decides that the character C belongs to the first character row. The one row select device 27 fetches the four position data of the rectangle of the character C, i.e. YTC, YBC, XLC and XRC, of the entry 5 of the first list and stores them in an entry 2 of the second list of the table memory 30. Also, the one row select device 27 replaces the pointer 5 in the entry 18 of the first list by the pointer 12 in the entry 5, and deletes the contents of the entry 5, whereby the entry 5 is skipped in the latter operations and the rectangle of the character "t" is followed by the rectangle of the character "m". In this manner, the one row select device 27 repeats the above operations for each rectangle in the first list. The contents of the modified first list and the new second list at the completion of the operations for all entries of the first list are shown in the Tables 5 and 6, respectively. The above assembly of the second list and the modification of the first list are shown as a block 307 in the FIG. 3.

The control unit 20 terminates the operations (D) and starts the next operations (E).

TABLE 5

| | MODIFIED FIRST LIST | | | | |
|---|---|---|---|---|---|
| ADDRESS | TOP EDGE | BOTTOM EDGE | LEFT EDGE | RIGHT EDGE | POINTER |
| 1 | | | | | 13 |
| 2 | | | | | |
| 3 | YTr | YBr | XLr | XRr | 0 |
| 4 | | | | | |
| 5 | | | | | |
| 6 | YTq | YBq | XLq | XRq | 11 |
| 7 | | | | | |
| 8 | YTP | YBP | XLP | XRP | 14 |
| 9 | YT, | YB, | XL, | XR, | 15 |
| 10 | YTn | YBn | XLn | XRn | 16 |
| 11 | YTz | YBz | XLz | XRz | 3 |
| 12 | YTm | YBm | XLm | XRm | 17 |
| 13 | YTl | YBl | XLl | XRl | 18 |
| 14 | YTy | YBy | XLy | XRy | 6 |
| 15 | YTx | YBx | XLx | XRx | 8 |
| 16 | YTw | YBw | XLw | XRw | 9 |
| 17 | YTu | YBu | XLu | XRu | 10 |
| 18 | YTt | YBt | XLt | XRt | 12 |

TABLE 6

| | SECOND LIST | | | |
|---|---|---|---|---|
| ADDRESS | TOP EDGE | BOTTOM EDGE | LEFT EDGE | RIGHT EDGE |
| 1 | YTD | YBD | XLD | XRD |
| 2 | YTC | YBC | XLC | XRC |
| 3 | YTB | YBB | XLB | XRB |
| 4 | YTA | YBA | XLA | XRA |

(E) Recognition of the character image specified by the contents of the second list It is noted that the position data stored in the second list, i.e. YTD, YBD, XLD, XRD, . . . YTA, YBA, XLA, XRA, indicates the positions of the rectangles in the image buffer 23, each of which surrounds the character images D, C, B, A stored in the image buffer 23.

The control unit 20 starts the operation (E) by activating the recognition unit 31. The recognition unit 31 is provided with decision trees for recognizing the character images, which have been well known in the art. The detail description of the decision trees, therefore, is not made in the specification. The recognition unit 31 accesses the entry 1 of the second list in the table memory 30 to fetch the position data YTD, YBD, XLD and XRD which represent the position of the rectangle surrounding the character D. And, the recognition unit 31 fetches the image data in the image buffer 23 surrounded by the rectangle. The recognition unit 31 recognizes the image of the character D by use of the decision tree and stores the results in an output buffer 32. Next, the recognition unit 31 fetches the position data YTC, YBC, XLC and XRC, of the entry 2 in the second list and performs the above operations to store the results of the recognition of the character C in the output buffer 32. The recognition unit 32 repeats the above operations until all position data stored in the second list have been used. The operations are shown as a block 308 in the FIG. 3.

The control unit 20 detects the termination of the operations (E) and supplies the contents of the output buffer 32 to an output device. It is noted that the four characters of the first character row of the document 1, shown in the FIG. 1A have been recognized. The control unit 20 determines the highest position of the top edge of the rectangles of the characters in the first list, i.e. the position of the top edge of the rectangle of the character r. Referring to the FIG. 1A, the top edge is located at the bit line 2B. The control unit 20 knows that an upper storage area between the top bit line and the bit line 2B of the image buffer 23 is now available for storing the next document image. The control unit 20 activates the scanner 21 to store the above next document image into the upper storage area, and the control unit 20 modifies the addresses of the bit lines of the upper storage area to continue to the address 23B which is the last bit line of the initially stored document image. That is, the top bit line of the upper storage area is assigned with an address 23B+1, the second bit line is assigned with an address 23B+2, and so on, whereby the continuity of the newly stored document image in the upper storage area to the initially stored image in the image buffer 23 is maintained.

When the image buffer 23 is filled with the new document image, the control unit 20 performs the operations (B) through (E). When the operation (E) is completed, the control unit 20 repeats the above operations until all characters in the document 1 have been recognized. At the completion of the recognition of each character row the control unit 20 supplies the output device, such as a printer, a display device, etc. with the contents of the output buffer 32, whereby the operator could have the results of the character recognition of the document 1.

Although the invention has been described by using the document 1 skewed or inclined in the counterclockwise direction, it is apparent that the invention could recognize the characters of the document which is skewed in the clockwise direction.

In the embodiment, the segmentation of the characters and symbols is described for the document with the characters in the words are spelled in the direction from left to right. The invention is capable of segmenting the characters and symbols spelled in an opposite direction, i.e. from right to left by arranging the pointers in the first list in the order from the right most rectangle to the left most rectangle in the character row by arranging the area 53 of the FIG. 5A on the left side of the rectangle 51.

An experiment using the present invention for recognizing the document including the three kinds of fonts, i.e., Courier 10, Courier 12 and Prestige Elite 12 with single vertical space between character rows has indicated that the characters of the document skewed by the maximum skew angle of 6 degrees in the clockwise or counterclockwise direction have been recognized with clear separation of the character rows, in other words, without the characters of the second character row shown in the FIG. 1A being erroneously considered in either or third rows.

Although the present invention has been described with some particularity in its preferred embodiment, many modifications will be apparent to those skilled in this art. In particular, the rectangles described could be changed to other suitable shapes (such as squares or ovals, if desired) and some of the features of the present invention may be used without the corresponding use of other features. Accordingly, the foregoing description should be considered as merely illustrative of the present invention, and not in limitaton thereof.

Having thus described the invention, what is claimed is:

1. A method for recognizing characters on a document comprising steps of:
    storing an image of said document in an image storage means;
    detecting position of rectangles in XY coordinates of said image storage means, which contact outer boundaries of character images, respectively in plural character rows stored in said image storage means, to generate position data representing said positions of said rectangles;
    forming a list in which said position data of the rectangles are arranged in the order from one end to the other end along the direction of X axis of said XY coordinates;
    detecting a range in Y axis for one character row based upon Y axis information of said position data of said rectangles in said list; and
    fetching said character images stored in said image storage means by using said position data of said rectangles which fall into said range, to recognize said fetched character images.

2. A method for recognizing characters on a document comprising steps of:
    storing image data representing image of said document in image storage means;
    detecting positions of rectangles in the XY coordinates of said image storage means, which contact outer boundaries of each character image in plural character rows stored in said image storage means to generate position data representing said positions of said rectangles:
    storing said position data of said rectangles to form a first list in which plural position data of said rectangles are arranged in the order from one end to the other end in a direction of X axis of said XY coordinates;
    determining the position data of a predetermined number of rectangles belonging to one character row to detect a skew of said document in said XY coordinates;
    generating a virtual position of each rectangle by correcting the position in Y axis of said XY coordinates of each rectangle in said first list by said skew to transfer said position data of said rectangles belonging to the first character row from said first list to a second list; and
    supplying from said image storage means to a character recognition means said image data surrounded by said rectangles specified by said position data in said second list.

3. A method for recognizing characters in a document according to claim 2, wherein said step of detecting positions of rectangles includes: a step of generating rectangles each of which contacts outer boundaries of discrete images of said document stored in said image storage means, and a step of determining as to whether each rectangle has a size which falls into a predetermined size range settled for said characters and symbols to be recognized.

4. A method for recognizing characters in a document according to claim 2, wherein said position data represents the positions of top, bottom, left and right edges of said rectangle in said XY coordinates.

5. A method for recognizing characters on a document according to claim 2, wherein said step of determining the position data includes a step of searching said first list to detect said predetermined number of rectangles, with a bottom left corner of one rectangle being located within a predetermined distance in said X and Y axes from a bottom left corner of the preceding rectangle, and a step of performing calculations of the positions of bottom left corners of said detected rectangles to detect said skew of said document.

6. A method for recognizing characters on a document according to claim 2, wherein said step of generating virtual position includes a step of sequentially reading said position data of said rectangles in said first list in said arranged order, a step of generating virtual position of each rectangle by correcting the position in said Y axis of each rectangle in said first list by said skew, a step of storing in a register the virtual position of said rectangle located at the highest position on said document, a step of sequentially reading again said position data of said rectangles in said first list, a step of generating said virtual position of said rectangle, a step of determining as to whether said generated virtual position falls into a predetermined range from said virtual position stored in said register, a step of transferring said position data of said rectangle in said first list, said generated virtual position of which falls into said predetermined range, to said second list.

7. A character recognition apparatus includes:
  image storage means for storing image of a document;
  means for detecting positions of rectangles each of which contacts outer boundaries of each of plural character images stored in said image storage means to generate position data representing said position;
  means for arranging said rectangles in the order from one end to the other end in a direction of X axis based upon X axis information of said position data;
  means for selecting rectangles belonging to a character row based upon Y axis information of said ordered rectangles: and
  means for fetching character images from said image storage means by using said position data of said rectangles to recognize said character images.

8. A character recognition apparatus of the type described in claim 7, wherein said means for detecting positions of rectangles determines as to whether a size of each rectangles falls into a scope of sizes of said characters and symbols to be recognized, and means for generating position data of rectangles falling into said scope of sizes.

9. A character recognition apparatus of the type described in to claim 7, wherein said position data represent upper, bottom, left and right edges of said rectangles in XY coordinates of said image storage means.

10. A character recognition apparatus of the type described in claim 7, wherein said means for arranging said rectangles including a first table memory storing a first list which stores said position data of said rectangles of plural character rows of said document in the order from one end to the other end in said direction of said X axis of said XY coordinates.

11. A character recognition apparatus of the type described in claim 7, wherein said means for selecting rectangles sequentially includes means for reading said position data of said rectangles of said first list in said arranged order, means for detecting a predetermined number of rectangles, in which a bottom left corner of one rectangle is located within predetermined distances in said X and Y directions from a bottom left corner of the preceding rectangle. means for detecting a skew of said document based upon the positions of bottom left corners of said detected rectangles, means for sequentially reading again said position data of said rectangles of said first list in said arranged order to generate a virtual position of each rectangle which is a Y axis position corrected by said skew, means for storing a virtual position located at a highest position of said document into a register, means for sequentially reading again said position data of said first list in said arranged order to generate said virtual positions of said rectangles, means for determining whether said generated virtual positions falls into a predetermined range from said virtual position in said register, and means for transferring said position data of rectangle having said virtual position falling into said predetermined range to a second list.

12. A character recognition apparatus of the type described in claim 7, wherein said means for selecting rectangles sequentially reads said position data from said second list to said character images surrounded by said rectangles and recognizes said character images.

* * * * *